(12) United States Patent
Venkatesh et al.

(10) Patent No.: US 11,695,750 B2
(45) Date of Patent: Jul. 4, 2023

(54) MUTUALLY AUTHENTICATED VOICE COMMUNICATIONS

(71) Applicant: Oracle International Corporation, Redwood Shores, CA (US)

(72) Inventors: Karthik Venkatesh, Bothell, WA (US); Matthew Wayne Williams, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 17/019,902

(22) Filed: Sep. 14, 2020

(65) Prior Publication Data
US 2022/0086139 A1 Mar. 17, 2022

(51) Int. Cl.
*H04L 29/06* (2006.01)
*H04L 9/40* (2022.01)

(52) U.S. Cl.
CPC ...... *H04L 63/0823* (2013.01); *H04L 63/0428* (2013.01); *H04L 63/061* (2013.01); *H04L 63/0838* (2013.01); *H04L 63/0861* (2013.01)

(58) Field of Classification Search
CPC ............. H04L 63/0823; H04L 63/0428; H04L 63/061; H04L 63/0838; H04L 63/0861
See application file for complete search history.

(56) References Cited

U.S. PATENT DOCUMENTS

| | | | | |
|---|---|---|---|---|
| 9,779,405 | B1* | 10/2017 | Krausz | H04W 12/041 |
| 2014/0137197 | A1* | 5/2014 | Lazaridis | H04W 12/06 |
| | | | | 726/3 |
| 2015/0088760 | A1* | 3/2015 | Meurs | G06Q 20/306 |
| | | | | 705/72 |
| 2015/0262170 | A1* | 9/2015 | Bouda | G06Q 20/322 |
| | | | | 705/67 |
| 2017/0331821 | A1* | 11/2017 | Filippidis | H04L 63/0876 |
| 2020/0162450 | A1* | 5/2020 | Yarabolu | H04L 63/0807 |
| 2021/0192023 | A1* | 6/2021 | Bryant | H04L 63/067 |

* cited by examiner

*Primary Examiner* — Vance M Little
(74) *Attorney, Agent, or Firm* — Kilpatrick Townsend & Stockton LLP

(57) ABSTRACT

The present disclosure relates generally to authentication of voice communications. Methods performed by a user device for mutually authenticated communications can include creating a first communication channel with a backend, creating a secure session across a second communication channel with the backend, receiving a first identification message from the backend via the second communication channel, receiving a second identification message from the backend via the first communication channel, sending an attestation that the second identification message matches the first identification message to the backend via the second communication channel, receiving a second step authorization instruction from the backend via the second communication channel, assessing the identity of the user, and delivering an authorization response to the backend via the second communication based of the assessed identity of the user.

20 Claims, 10 Drawing Sheets

MUTUALLY AUTHENTICATED VOICE COMMUNICATIONS

TECHNICAL FIELD

The present disclosure relates generally to communication security.

BACKGROUND

Telephone has long been used a means for communication and for conducting business. When close acquaintances are speaking via telephone, it is possible to verify the identity of the person on the other end of the line by the sound of their voice and their speech patterns. However, when a phone call is made to someone who is not a close acquaintance, this verification becomes very difficult. This challenge particularly arises when a customer calls a business. These calls are frequently routed/directed to a call center. The customer then is usually unable to verify the identity of the customer service representative, and similarly, the customer service representative usually has great difficulty verifying the identity of the customer.

To provide some level of security and identification, customer service representatives frequently are provided access to information relevant to the alleged customer. This information can include information contained in an account associated with the customer, and can include, for example: one or several security questions and answers; or personal information such as a full legal name, birthdate, names of close family members, previous addresses, or the like. While the use of this information can provide some level of security, this level of security has been greatly diminished with the rise of social media, as much of this information can be found in a person's social media accounts.

Thus, current practices used to verify identification have several significant shortcomings and fail to deliver the level of security that has become expected. Accordingly, new techniques for authenticating voice communications are desired.

BRIEF SUMMARY

The present disclosure relates generally to authentication of voice communications. One aspect of the present disclosure relates to a method for mutually authenticated communications. The method includes creating with a user device a first communication channel with a backend, creating with the user device a secure session across a second communication channel with the backend, receiving with the user device a first identification message from the backend via the second communication channel, receiving with the user device a second identification message from the backend via the first communication channel, sending with the user device an attestation that the second identification message matches the first identification message to the backend via the second communication channel, receiving with the user device a second step authorization instruction from the backend via the second communication channel, assessing with the user device the identity of the user, and delivering an authorization response to the backend via the second communication based of the assessed identity of the user.

In some embodiments, the first communication channel can be a voice connection via telephonic network, and the second communication channel can be an internet connection. In some embodiments, creating the secure session across the second communication channel with the backend includes logging in to a pre-established user account. In some embodiments, creating with the secure session across the second communication channel with the backend includes downloading with the user device an application for generating a secure session with the backend across the second communication channel, and registering the user for mutually authenticated communications. In some embodiments, registering the user for mutually authenticated communications includes: generating a key pair including a public key and a private key, storing the private key on the user device, transmitting the public key to the backend, gathering security information from the user, and binding the private key and the security information.

In some embodiments, the authorization response is encrypted by the user device with the private key. In some embodiments, gathering security information from the user includes gathering security information via at least one sensor of the user device. In some embodiments, the security information can include biometric information of the user. In some embodiments, the at least one sensor of the user device can be at least one of: a fingerprint scanner; a camera; an ocular scanner; and a microphone.

In some embodiments, binding the security information and the security information includes: generating an object representative of the security information, and linking the object representative of the security information with the private key. In some embodiments, the method includes determining that the first identification message matches the second identification message, and encrypting the attestation with the private key. In some embodiments, sending with the user device the attestation that the second identification message matches the first identification message to the backend via the second communication channel includes sending the encrypted attestation.

In some embodiments, each of the first identification message and the second identification message can be a One Time Pin. In some embodiments, the method includes executing an identification algorithm on the user device to gather identification information of the user. In some embodiments, the identity of the user is assessed based on the gathered identification information. In some embodiments, the user device delivers the authorization response to the backend via the second communication channel when the assessed identity of the user matches the user associated with the pre-established user account. In some embodiments, assessing with the user device the identity of the user includes triggering a security module of the user device to gather the identification information and determine the identity of the user based on the gathered identification information. In some embodiments, determining the identity of the user based on the gathered identification information includes determining that the gathered security information corresponds to information associated with the pre-established user account.

One aspect of the present disclosure relates to a non-transitory computer-readable storage medium storing a plurality of instructions executable by one or more processors. The plurality of instructions when executed by the one or more processors cause the one or more processors to create with a user device a first communication channel with a backend, create with the user device a secure session across a second communication channel with the backend, receive with the user device a first identification message from the backend via the second communication channel, receive with the user device a second identification message from the backend via the first communication channel, send with the user device an attestation that the second identification message matches the first identification message to the backend via the second communication channel, receive with the user device a second step authorization instruction from the backend via the second communication channel, assess with the user device the identity of the user, and deliver an authorization response to the backend via the second communication based of the assessed identity of the user. In some embodiments, the first communication channel can be a voice connection via telephonic network, and the second communication channel can be an internet connection.

One aspect of the present disclosure relates to a system for mutually authenticated communications. The system includes a user device including a memory including a private key, and a processor. The processor can create a first communication channel with a backend, create a secure session across a second communication channel with the backend, receive a first identification message from the backend via the second communication channel, receive a second identification message from the backend via the first communication channel, send an attestation that the second identification message matches the first identification message to the backend via the second communication channel, receive a second step authorization instruction from the backend via the second communication channel, assess the identity of the user, and deliver an authorization response to the backend via the second communication based of the assessed identity of the user.

In some embodiments, the first communication channel can be a voice connection via telephonic network, and the second communication channel can be internet connection. In some embodiments, the user device delivers the authorization response to the backend via the second communication channel when the assessed identity of the user matches a user associated with a pre-established user account.

Various embodiments are described herein, including methods, systems, non-transitory computer-readable storage media storing programs, code, or instructions executable by one or more processors, and the like.

The foregoing, together with other features and embodiments will become more apparent upon referring to the following specification, claims, and accompanying drawings.

DETAILED DESCRIPTION

Figure 1:
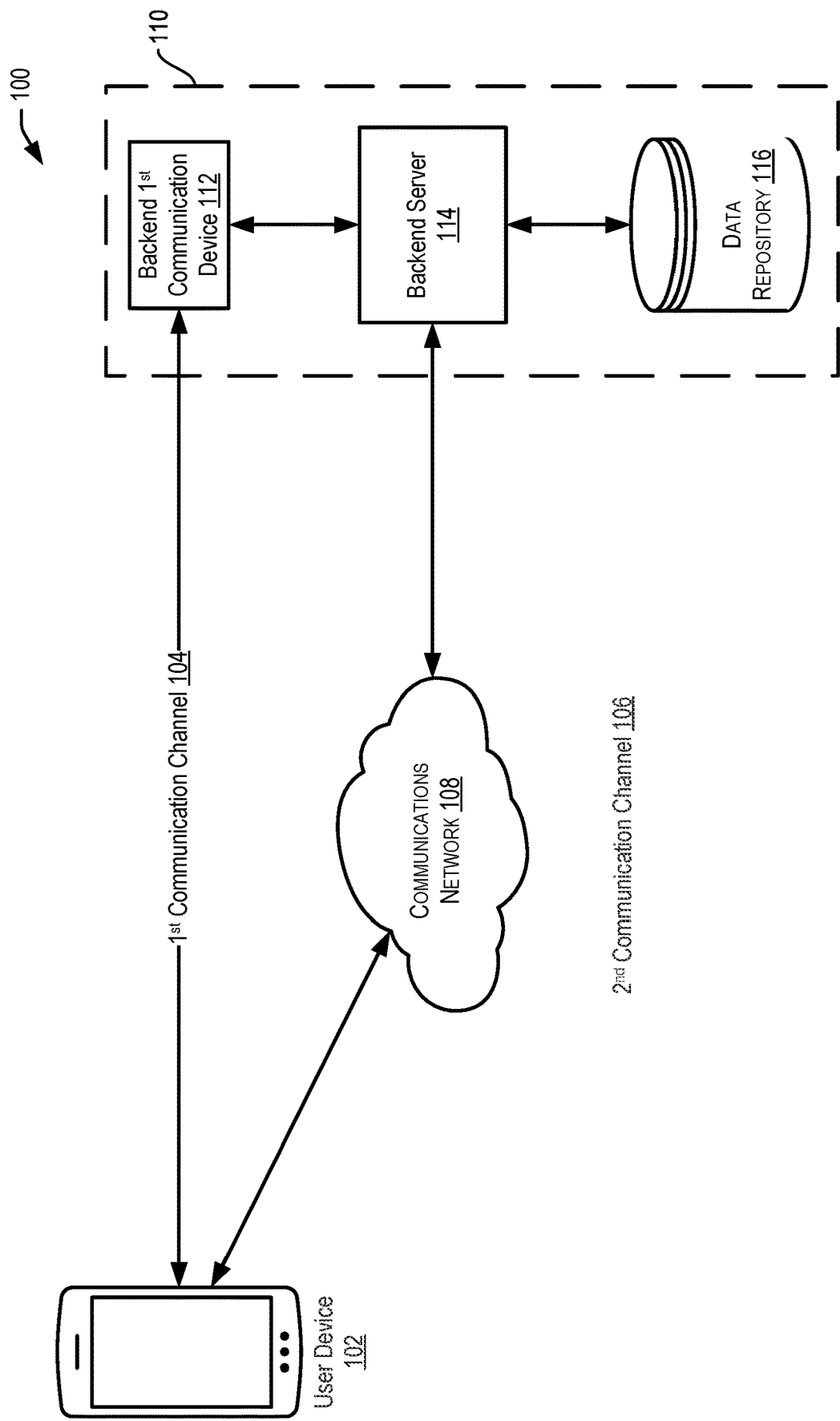
FIG. 1 depicts a schematic illustration of one embodiment of a system for mutually authenticated communications.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Voice communications are opaque in that there is currently no way of authenticating speakers. This creates significant security risks as, unless the speakers are so well acquainted that they recognize each other's voices, one speaker can never be sure of the identity of the other speaker. In the context of a call to an organization, this creates risks to both the party making the call and the party receiving the call. Specifically, the party making the call cannot be sure that they are talking with a representative of the organization, and the party receiving the call cannot be sure that the caller is to they purport to be.

Current techniques for mitigating these risks have proven inadequate, especially in light of the large volume of information available via social media or via personally identifiable information that can be, for example, available on the dark web via high profile data breaches. Specifically, security questions have long been used to validate the identity of the caller to an organization. These questions recently have an answer tied to some aspect of the caller's life such as, for example, the middle name of the caller's grandmother, the caller's birthplace, or the caller's favorite sports team. However, as much of this information can be found on social media or from data breaches, the protective value of these questions and answers have greatly diminished.

Accordingly, techniques for mutually authenticated voice communications are desired. These techniques can provide strong authentication by leveraging multiple parallel communication channels. For example, two channels of communication can be created between the caller and an organization. These channels can include a first channel such as voice communication via telephone network and the second channel via, for example, the Internet. The addition of the second channel enables leveraging of existing Internet security features and protocols. This can include the creation of a secure session across the second communication channel between a user device controlled by the caller and a backend, which backend can include, for example, one or several servers, processors, computers, or the like. This user device can be a device that can access the Internet, and in some embodiments, can be a device that can establish both the first communication channel and the second communication channel such as, for example, a smart phone which can communicate via a telephone network and via the Internet. The user can create a secure session by logging into a pre-existing user account with the backend.

With the secure session established on the second channel, and identification message to be generated by the backend and can be delivered to user device via the second communication channel, and then via the first communication channel. If the identification message is received via the first and second communication channels match, the user can attest to this match, and in some embodiments, can attest to the identification message received via the first communication channel being correct. This attestation can be delivered from the user device to the backend via the second communication channel. In some embodiments, this attestation can be signed by the user device, which can include the cryptographic signing of the attestation the application of a private key. This signing of the attestation can uniquely link the attestation to the user and/or to the user device, and in some embodiments, the backend can use a public key corresponding to the private key used in signing the attestation to cryptographically verify the attestation. Through this protocol with the identification message, the user can validate the identity of the person with which they are speaking, and specifically can validate that the person with which they are speaking is a representative of the organization as they have access to the backend and to information generated by that backend.

Upon receipt of the attestation of matching identification messages, the backend can send a prompt to the user device authorizing a second step validation subroutine. In this second step validation subroutine, the user device, and specifically a security module of the user device can gather security data. Based on the security data, it can be determined whether the individual from which the security data is gathered matches the user logged into the secure session with the backend. If the individual from which the security data is gathered matches the user logged into the secure session with the backend, then the user device sends acknowledgment indicating that the user is authorized, and the backend, and specifically the backend server can provide an indicator to the individual on the backend communicating via the first communication channel that the identity of the caller has been authenticated.

Thus, by utilizing multiple transition channels and leveraging aspects of each, the identity of both the caller and the recipient of the call have been authenticated. Further, this occurs well maintaining security data on the user device, thus minimizing risk of the backend data breach releasing security data for users.

With reference now to FIG. 1, a schematic illustration of one embodiment of a system 100 for mutually authenticated communications is shown. The system 100 can include user device 102. User device 102 can be a single device as shown in FIG. 1, or can be multiple devices together performing the functions of the user device 102 outlined herein. The user device 102 can be configured for communication via a first communication channel 104 and a second communication channel 106. In some embodiments the user device 102 can be configured for voice communication across a first communication channel 104 and for non-voice communication via a second communication channel 106, which second communication channel 106 can be, for example, one or several computing networks 108 and/or communication networks 108 such as, for example, the Internet.

The user device 102 can comprise any device configured to communicate via a first communication channel 104 comprise a telephone network and the second communication channel 106 comprising the Internet. In some embodiments, user device 102 can comprise a computing device such as a personal computer configured to communicate via telephone network and the Internet, a laptop configured to communicate via a telephone network and the Internet, a tablet configured to communicate via telephone network and the Internet, a smart phone, or the like.

In some embodiments, the first communication channel 104 and the second communication channel 106 can comprise distinct communication infrastructure and/or hardware, and in some embodiments, the first communication channel 104 and the second communication channel 106 can comprise distinct communications across wholly or partially common infrastructure and/or hardware. For example, in some embodiments when communicating with a smart phone as the user device 102, the first communication channel 104 may be via a cellular network and the second communication channel 106 may be via a Wi-Fi connected to the smart phone. Alternatively, in other embodiments when communicating with the smartphone is the user device 102, both the first and second communication channels 104, 106 may be via the cellular network or when using a voice over Internet protocol (VoIP) both the first and second communication channels 104 may be across the Internet.

The system 100 can include a backend 110. The backend 110 can comprise one or several devices which, alone or in aggregate are configured to communicate via the first communication channel 104 and the second communication channel 106. The backend 110 can be controlled by the organization calling or being called by the user via the user device 102. The backend 110 can include a backend first communication device 112, a backend server 114, and/or a backend data repository 116. The backend first communication device 112 can be configured to communicate via the first communication channel 104 and can comprise, for example, a telephone or any hardware or software configured to enable voice communication via the first communication channel 104.

The user device 102 can be used by a user in mutually authenticated voice communications with the backend 110. The user of the user device 102, also referred to herein as a caller, can comprise an individual calling an organization associated with, and/or controlling the backend 110 and/or receiving a call from that organization. The backend first communication device 112 can be used by a backend user in the mutually authenticated voice communications with the user device 102. The user of the backend first communication device 112, also referred to herein as a representative, can comprise an individual receiving a call from the caller and/or calling the caller.

The backend 110 can include the backend server 114. The backend server 114 can communicate via the second communication channel 106. The backend server 114 can be any desired computing device including, for example, one or several servers, computers, processors, or the like. The backend server can, in some embodiments, communicate with the backend first communication device 112 and/or with representative. In some embodiments, the representative can represent the organization called or calling the user. This representative can be, for example, an employee of the organization working in a call center. In some embodiments, for example, the backend first communication device 112 can comprise a terminal having software enabling voice communications via the first communication channel and accessing the backend server 114.

The backend 110 can further include a data repository 116. The data repository 116 can comprise any desired memory or storage. The data repository 116 can include, for example, one or several memory hardware components and/or storage accessible by the backend 110. In some embodiments, the data repository can store information relating to interactions between the backend 110 and the user device 102. This can include, for example, a recording of voice communications via the first communication channel 104, and/or information generated and/or received the of the second communication channel.

Figure 2:
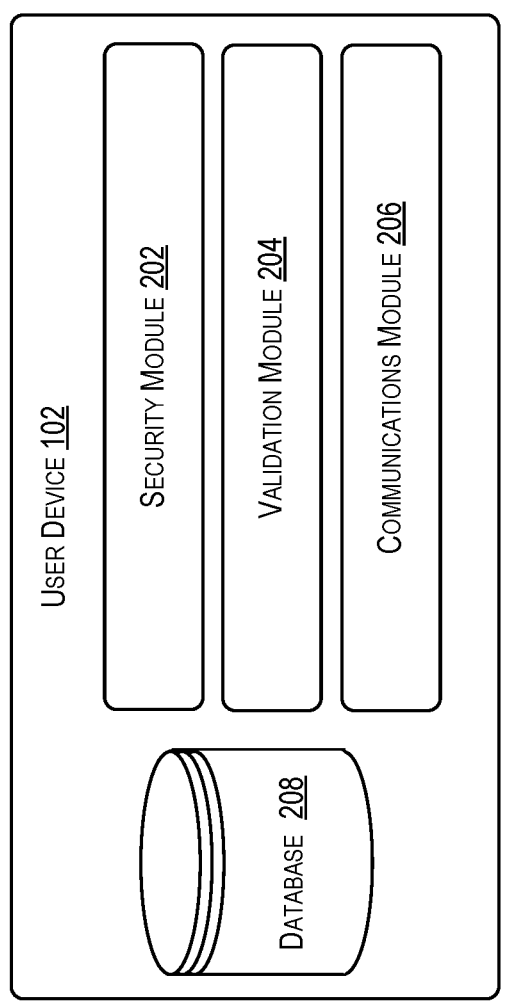
FIG. 2 is a depiction of one embodiment of one embodiment of the user device.

With reference now to FIG. 2, a schematic illustration of one embodiment of the user device 102 is shown. The user device 102 can include one or several hardware features and/or software modules. In some embodiments, the user device 102 includes a security module 202. The security module 202 can be configured to receive, gather, and/or generate security data. In some embodiments, the security module can comprise a software and/or hardware module. In some embodiments, the security module can include one or several sensors including, for example, one or several fingerprint scanners, cameras, ocular scanners, microphones, or the like. In some embodiments, the security module 202 can be configured to gather and/or generate security data, also referred to herein a security information, which security data can include, for example, a password, a personal identification number, biometric information, or the like. In some embodiments, the security module can create an object associated with the security information. For example, in the case of biometric data, the security module 202 can generate an object such as a hash from the biometric data, which object can be stored in, for example, database 208 of the user device 102.

In some embodiments, the security module 202 can be configured to use this security information to ascertain and/or assess the identity of the user of the user device 102. In some embodiments, this can include the comparison of the security information gathered and/or generated by the security module 202 to security information previously gathered and/or generated by the security module 202 and stored in the database 208. In some embodiments, the security data previously gathered and/or generated by the security module 202 and stored in the database 208 can be linked with the user such that when later gathered security data matches this previously gathered and/or generated security data, the identity of the user is confirmed.

The device 102 can include a validation module 204. The validation module 204 can be configured to interact via the second communication channel 106 with the backend 110 in performing mutually authenticated voice communications. The validation module 204 can interact with the security module 202, and specifically can request the security module 202 assess the identity of the user, upon the completion of which assessment, the security module 202 can receive an indication of the identity of the user. The validation module 204 can communicate the results of this assessment with the backend 110.

The user device 102 can include a communications module 206. The communications module 206 can be configured to communicate via the first communication channel 104. In some embodiments, communications module 206 can communicate with one or both of the security module 202 and the validation module 204. In some embodiments, the communications module 206 can communicate with the backend 110, and specifically with the backend server 114 via a secure session. In some embodiments, the communications module 206 can communicate with the backend 110 in the secure session via one or several communication and/or security protocols.

The user device 102 can include database 208. The database 208 can include information used in performing mutually authenticated voice communications. This can include, for example, a key pair for the user including, for example one or both of a private key and a public key, security data including, for example, an object corresponding to security data such as, for example, biometric information, a binding of the security information and the user's private key, or in other words an association between an object corresponding to the security data and the user's private key, and one or several tokens associated with secure and/or authenticated sessions between the user device 102 and the backend 110 V of the second channel 106.

Figure 3:
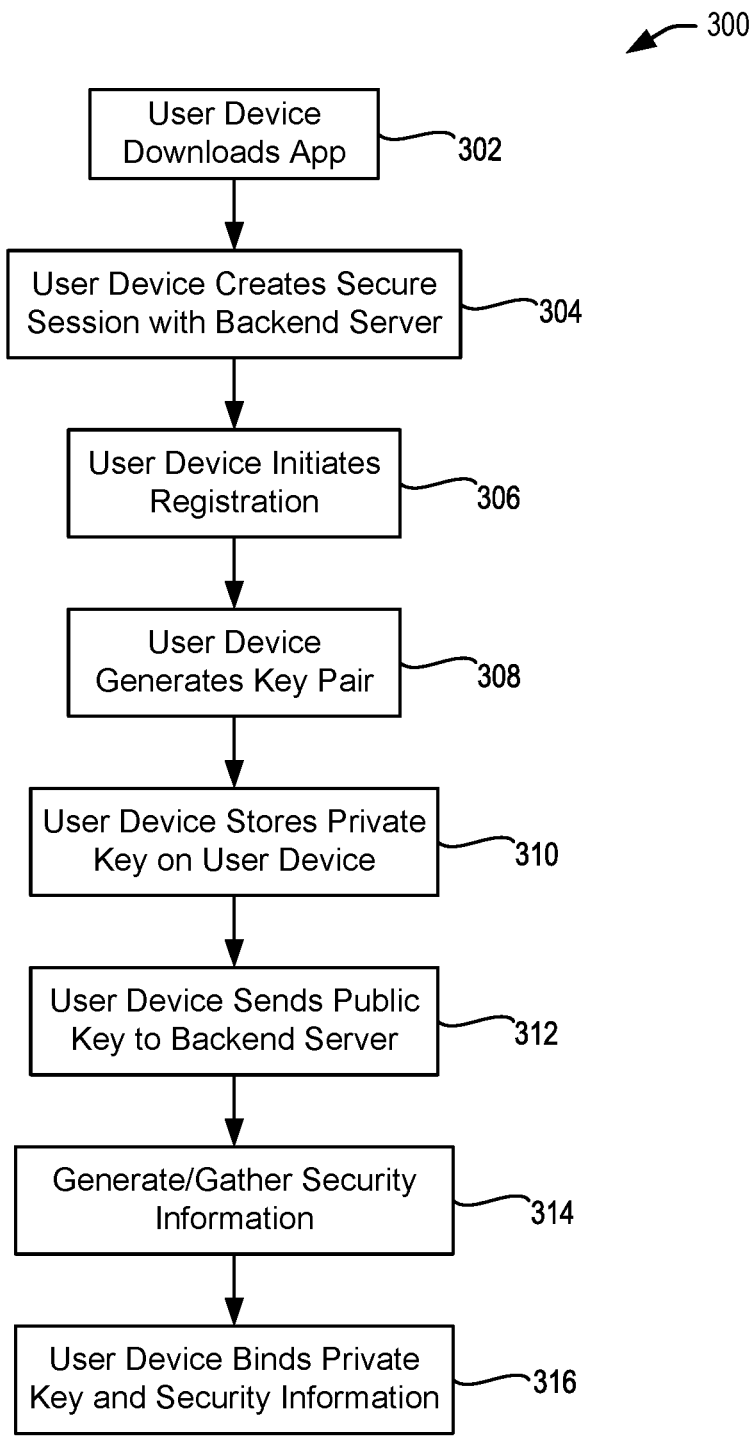
FIG. 3 is a flowchart illustrating one embodiment of a process for registration.

With reference now to FIG. 3, a flowchart illustrating one embodiment of a process 300 for registration is shown. The process can be performed as a part of mutually authenticated voice communications, and specifically, the process 300 can be performed to generate keys and information used in performing mutually authenticated voice communications. The process 300 can be performed by the user device 102.

The process begins at block 302, wherein the user device 102 downloads a verification application. This application can be downloaded from any location, including an app sharing website or from a website controlled by the organization associated with the backend. This app can, in some embodiments, control the user device 102 to perform many of the steps of process 300 and of process 400.

At block 304, the user device 102 creates a secure session with the backend 110, and specifically with the backend server 114. The secure session can be created by communications via the second communication channel 106, and specifically by communications across the Internet. In some embodiments, the secure session can be created by the user logging into a pre-existing account. The user can log into the pre-existing account via any desired login protocol including, for example, with the username and password associated with the pre-existing account. In some embodiments, the pre-existing account can be an account with the organization associated with and/or controlling the backend 110.

At block 306, the user device 102 initiates registration. This registration can include the generating and/or gathering of security data from the user via the user device 102 and the linking of that security data to the user and/or to an account associated with that user. The security data and other information generated and/or gathered during registration can then be used by a combination of the backend 110 and the user device 102 for providing mutually authenticated voice communications. As indicated at block 308, user device 102 can generate a key pair. This key pair can include a private key and a corresponding public key. This key pair can be used for public-key cryptography, wherein the private key can be used by the user device 102 to encrypt and/or sign messages that can then be decrypted by a recipient device with the public key. Via this digital signature created with the private key, the recipient of the signed message can authenticate the identity of the sender.

The user device 102 can store the private key as indicated in block 310 and can provide the public key to the backend 110, and specifically to the backend server 114 as indicated in block 312. In some embodiments, the user device 102 can store the private key in the database 208 of the user device 102. The public key can, in some embodiments, be stored by the backend 110 in the data repository 116.

Block 314 security information is generated and/or gathered. In some embodiments the security information can be generated and/or gathered by the security module 202. In some embodiments, for example, the user device 102 can send requested the security module 202 together and/or generate the security information. In some embodiments, and as a part of the gathering and/or generation of the security information, where several instructions or prompts may be given to the user of the user device 102 directing the interactions of user of the user device 102 with the user device 102 to generate and/or gather the security information. In some embodiments, the security information can be gathered and/or generated via one or several features of the user device 102 and/or of the security module 202. These features can include one or several sensors of the user device 102 and/or of the security module 202 including, for example, at least one of: a camera; a microphone; a fingerprint scanner; a touchscreen, keyboard, or keypad; and an ocular scanner.

In some embodiments, the security information can include biometric information such as, for example, an ocular scan, a fingerprint, a thumbprint, a photo, or the like. In some embodiments, the security module 202 and/or the user device 102 can generate an object representative of the security information. For example, biometric information such as, for example, as a fingerprint can be used to generate a high-entropy character string such as, for example, the hash value. This object can be stored in database 208 of the user device 102.

After the security information has been gathered and/or generated, the process 300 proceeds to block 316 wherein the user device 102 binds the private key and the security information. In some embodiments this can include the binding of the object associated with the security information with the private key. In some embodiments, this binding can include linking the security information with the private key, and specifically linking the object associated with the security information with the private key.

Figure 4:
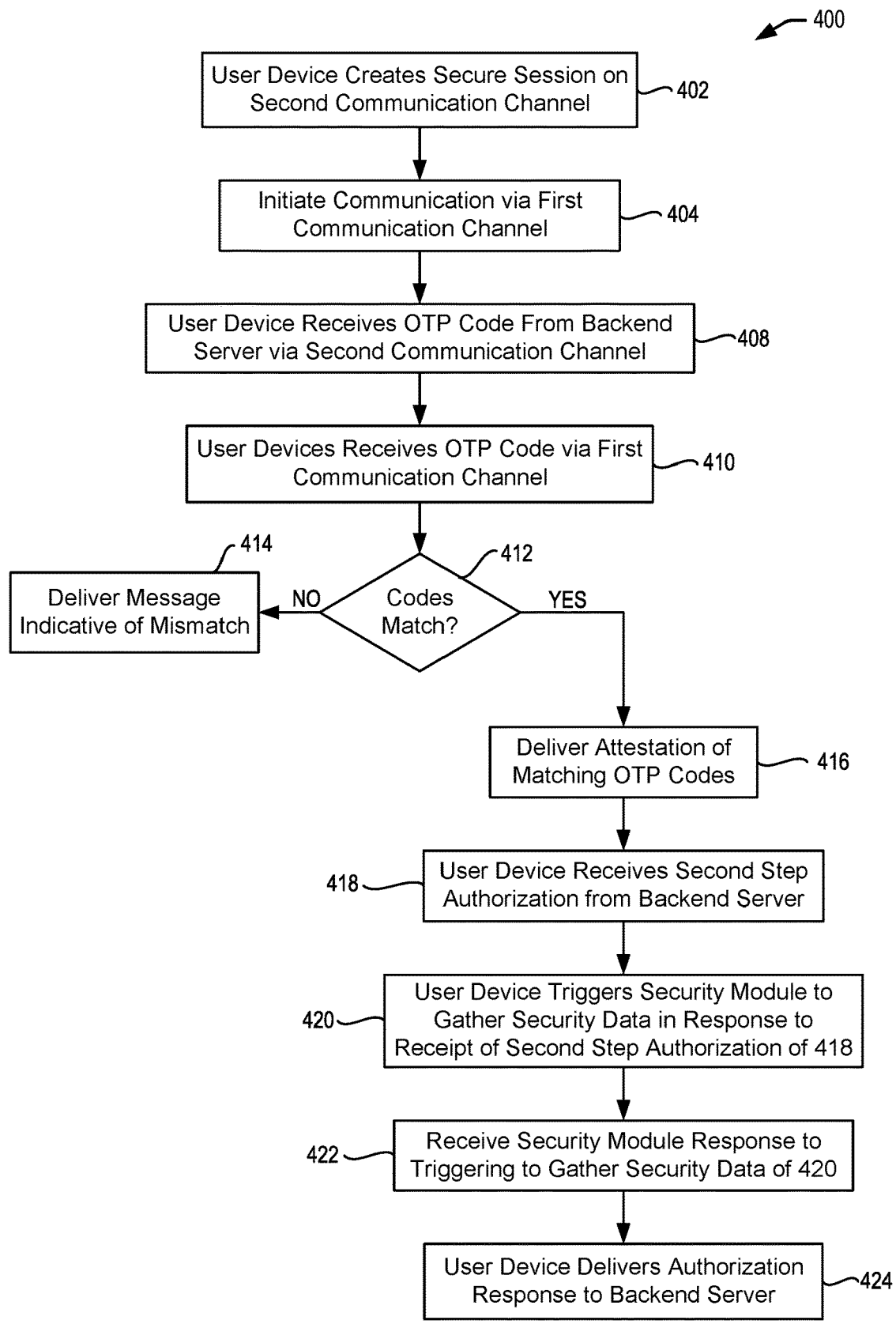
FIG. 4 is a flowchart illustrating one embodiment of a process for authenticating voice communication.

With reference now to FIG. 4, a flowchart illustrating one embodiment of a process 400 for authenticating voice communication is shown. The process 400 can be performed as a part of mutually authenticated voice. The process 400 can be performed by the user device 102. The process begins at block 402, wherein the user device creates a secure session with the backend 110, and specifically with the backend server 114 via the second communication channel 106. In some embodiments, creating the secure session can include logging in to the pre-established user account. The user can log into the pre-existing account via any desired login protocol including, for example, with the username and password associated with the pre-existing account. In some embodiments, creating the secure session can include launching the verification application, also referred to herein as the validation application.

At block 404 communication is initiated between the user device 102 and the backend 110 via the first communication channel 104. In some embodiments, this communication can be between the user device 102 and the backend first communication device 112. In some embodiments, this communication can be initiated by the user device 102 calling the backend 110, or alternatively can be initiated by the backend 110 calling the user device 102. This communication via the first communication channel 104 can be a voice communication.

Blocks 408 through 412 includes steps for a first aspect of authenticated voice communication. These steps relate to the use of identification messages, the first of which identification messages is received at the user device 102 via the second communication channel 106, and the second of which identification messages is received at the user device 102 via the first communication channel 104. It is intended that, when the representative is who he purports to be, or in other words, when the representative is an agent of the organization associated with the backend, that the first and second identification messages match. Thus, the user and/or user device 102 can compare the first identification message with the second identification message and determine if the identification messages match. If the first and second identification messages match, then the identity of the representative is authenticated, and the user and/or user device can provide an attestation of the same.

More specifically, at block 408 the user device 102 receives a first identification message from the backend 110 via the second communication channel 106. In some embodiments, this first identification message can comprise a One Time Pin ("OTP"). This first identification message can be received by the validation module 204 and/or the communications module 206. In some embodiments, this first an identification message can be generated by the backend 110, and specifically by the backend server 114.

At block 410 the user device 102 receives a second identification message from the backend 110 via the first communication channel 104. In some embodiments, this can include the user device 102 receiving the second identification message from the backend first communication device 112. The second identification message can comprise an OTP.

At decision step 412, and it is determined if the first identification message and the second identification match. In some embodiments, this can include comparing the first identification message and the second identification message, and in some embodiments, this can include determining whether the user indicates via an input to the user device 102 that the first and second identification messages match. In embodiments in which each of the first and second identification messages comprises on OTP, decision step 412 can include determining whether the first OTP matches the second OTP.

If it is determined that the first and second identification messages do not match, then the process 400 proceeds to block 414 wherein a message indicative of the mismatch is delivered. In some embodiments, this message indicative of the mismatch is delivered from the validation module 204 to the communications module 206. The communications module 206 can, in some embodiments, deliver the message indicative of the mismatch between the first and second identification messages to the backend 110, and specifically to the backend server 114. In some embodiments, and as part of delivering the message indicative of a mismatch, the user device 102 can output a message to the user directing the user to terminate communication with the alleged representative as the alleged representative cannot be authenticated. In some embodiments, an initial failure to match first and second identification messages can result in returning to repeat steps 408 through 412 to provide a second attempt to authenticate the alleged representative. However, if the alleged representative ultimately cannot be authenticated, then the user device 102 can direct the user to terminate communications with the alleged representative.

Returning again to decision step 412, if it is determined that the first and second identification messages match, then the process 400 proceeds to block 416 wherein an attestation of matching identification messages is delivered. In some embodiments, this can include the validation module 200 for directing the communication module 206 to send an attestation to the backend 110, and specifically to the backend server 114 that the second identification message matches the first identification message. In some embodiments, the communication module 206 can encrypt and/or sign the attestation, also referred to herein as the attestation message, using, for example, the private key. After encryption and/or signing, the communication module 206 can send the encrypted and/or signed attestation message to the backend 110, and specifically to the backend server 114 views second communication channel 106.

At block 418 the user device 102 receives a second step authorization instruction from the backend 110, and specifically from the backend server 114 via the second communication channel 106. At blocks 420 and 422, the user device 102 assess the identity of the user, or more specifically, reassesses the identity of the user by leveraging a secondary factor of authentication. This can include the execution of an identification algorithm on the user device 102 to gather and/or generate identification information of the user, and then assessing the user identity based on the gathered and/or generated identification information. The execution of the identification algorithm on the user device 102, can include the triggering of the security module 202 to generate and/or gather identification information from the user as indicated in block 420. This can include the user of one or several features of the user device 102 and/or the security module 202 to generate and/or gather the identification information. In some embodiments, the security information can be gathered and/or generated via one or several features of the user device 102 and/or of the security module 202, which features can include one or several sensors of the user device 102 and/or of the security module 202. These one or several sensors can include, for example, at least one of: a camera; a microphone; a fingerprint scanner; a touchscreen, keyboard, or keypad; and an ocular scanner. The security module 202 can generate an object representing the generated and/or gathered security information.

The security module can, in some embodiments, determine and/or validate the identity of the user based on the generated and/or gathered identification information. This can include the comparison of the newly generated and/or gathered security information to previously generated and/or gathered security information linked with a user of the account through which the secure session is created. If the newly generated and/or gathered security information matches the previously generated and/or gathered security information linked with the user account through which the secure session is created, then the identity of the user is authenticated and/or validated. Thus, if it is determined that the gathered security information corresponds to information associated with the pre-established user account, then the identity of the user is authenticated and/or validated. Alternatively, if the newly gathered and/or generated security information does not match with the previously gathered and/or generated security information, then the identity of the user is not authenticated and/or validated.

The security module 202 can output a response indicating whether the identity of the user is authenticated and/or validated. This response can be received by the validation module 204 of the user device 102 as indicated in block 422. Based on this received response, an authorization response can be generated by the user device 102 and can be delivered by the user device 102 to the backend 110, and specifically to the backend server 114. In some embodiments, this authorization response can include information indicating whether the identity of the user was validated and/or authenticated. Thus, in some embodiments, the authorization response can be generated and sent when the assessed identity of the user matches the user associated with the pre-established user account.

In some embodiments, the authorization response can be generated by the validation module 204 and/or the communication module 206, and the authorization response can be sent to the backend 110 by the communication module 206. In some embodiments, this authorization response can be encrypted and/or signed by, for example, the private key.

Figure 5:
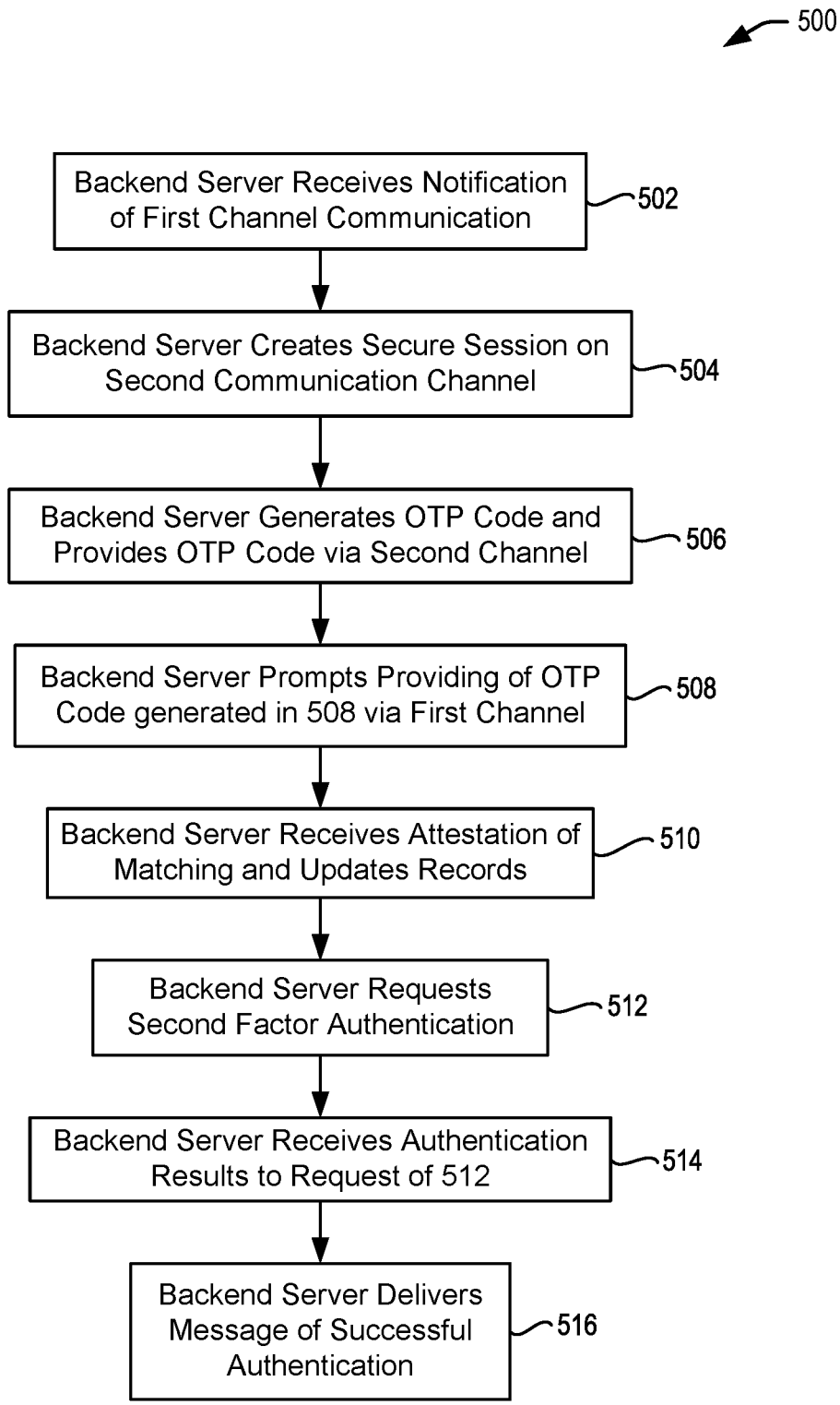
FIG. 5 is a flowchart illustrating one embodiment of a process for backend mutual authentication.

With reference now to FIG. 5, a flowchart illustrating one embodiment of a process 500 for backend mutual authentication is shown. The process 500 can be performed by all or portions of the backend 110, including, for example, the backend server 114. The process 500 begins at block 502 wherein the backend server 114 receives notification of first channel communication. In some embodiments, this attestation can be received by the backend server 114 from the backend first communication device 112. In some embodiments, this attestation can be received by the backend server subsequent to the establishment of voice communications via the first communication channel 104.

A block 504 the backend server 114 creates a secure session on the second communication channel 106. In some embodiments, this step a counterpart step by the backend server 114 to the step performed in block 402 of process 400 by the user device 102. In some embodiments sister session can be treated by the receipt of information from the user device 102 including, for example, user name and/or password. In some embodiments, the creation of the secure session can include the portion of the notification to the user device 102 by the backend 110, and specifically by the backend server 114, to create the secure session.

At block 506 the backend 110, and specifically the backend server 114 generates an identification message, and then sends the identification message as the first identification message to the user device 102 via the second communication channel 106. The backend 110, and specifically the backend server 114 then prompts and/or directs the sending of the identification message as the second identification message to the user device 102 via the first communication channel 104. Thus, the backend 110, and specifically the backend server 114 sends the same identification message to the user device 102 in the form of the first notification message via the second communication channel 106 and the second notification message via the first communication channel 104.

The backend 110, and specifically the backend server 114, receives attestation of the matching of the first and second identification messages at block 510. In some embodiments, this attestation is received from the user device 102 by the backend server 114 via the second communication channel 106, as indicated in block 512. This attestation can be encrypted and/or signed via the private key of the user. The backend 110, and specifically the backend server 114, can decrypt and verify the signature via the public key of the user. Upon validating the authenticity of the attestation and that the attestation indicates the matching of the first and second identification messages, the backend 110, and specifically the backend server 114, can request second factor authentication by the user device 102 as indicated in block 514.

At block 516 the backend 110, and specifically the backend server 114, can receive the results to the authentication request a block 512. These results can be received by the backend 110, and specifically by the backend server 114, from the user device 102 via the second communication channel 106. In some embodiments, these results are the authorization response delivered by the user device in block 424 of FIG. 4. Upon receipt of the authentication results, and if the authentication results indicate successful authentication and/or validation of the identity of the caller, the backend 110, and specifically the backend server 114, can deliver message of successful authentication as indicated in block 518. In some embodiments, this message can be delivered by the backend server 114 to the backend first communication device 112, and specifically to the representative communicating with the caller via the first communication channel 104. Alternatively, if authentication is unsuccessful, the backend 110, and specifically the backend server 114 can deliver message indicative of the unsuccessful authentication of the identity of the caller to the backend first communication device 112, and specifically to the representative communicating with the caller via the first communication channel 104.

Example Implementation

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
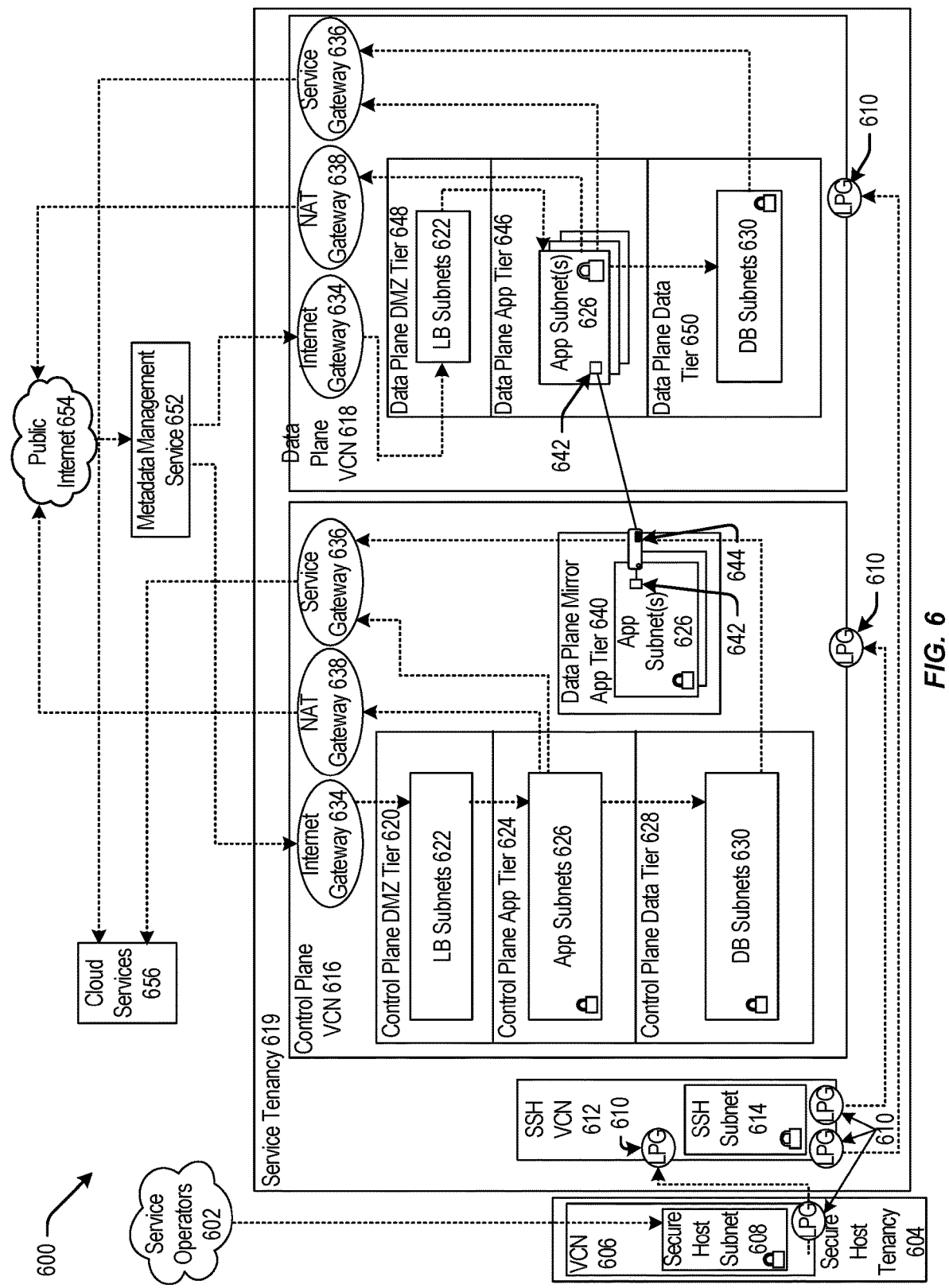
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plan VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
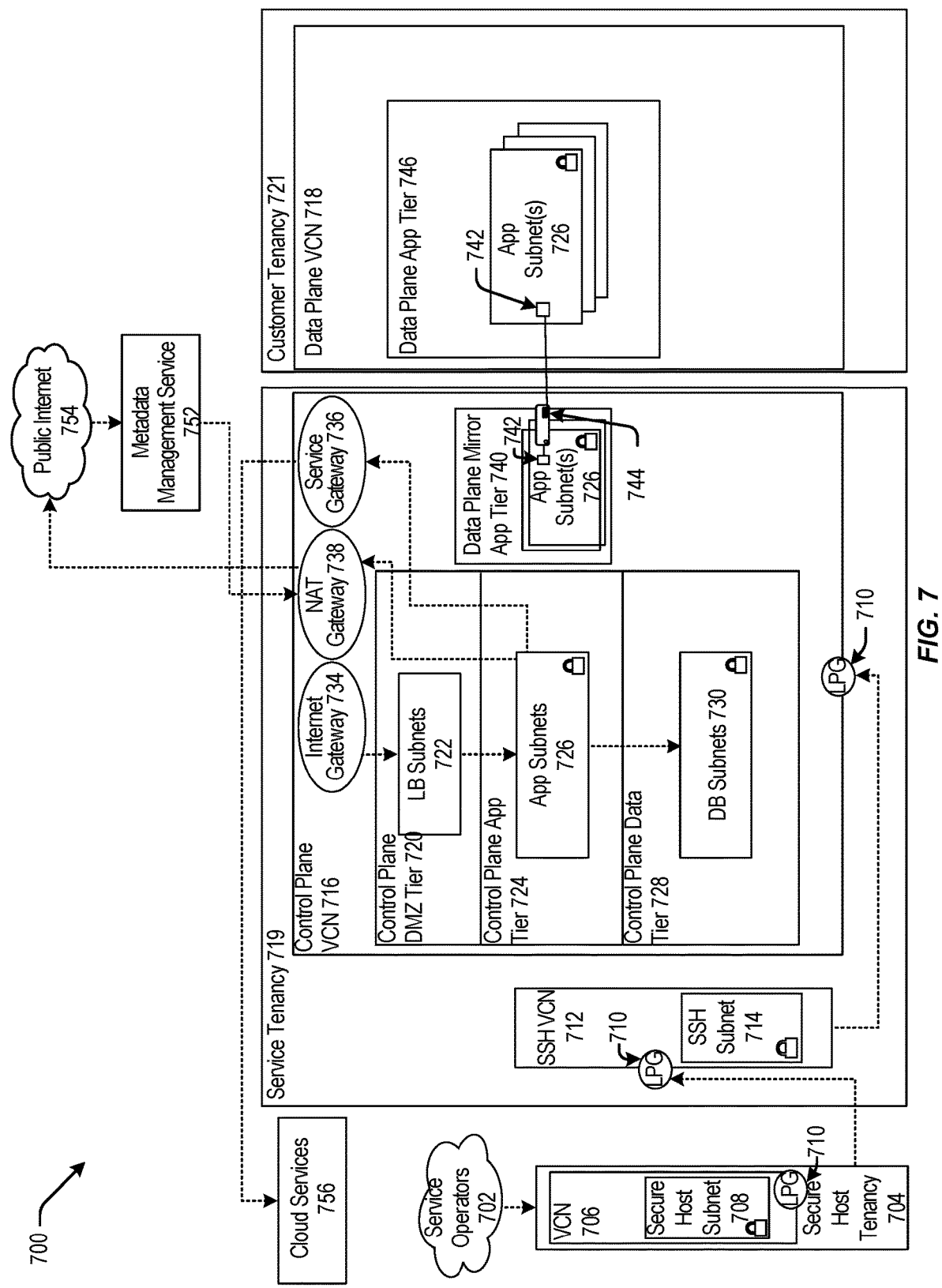
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plan app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 1," may be located in Region 1 and in "Region 2." If a call to Deployment 1 is made by the service gateway 736 contained in the control plane VCN 716 located in Region 1, the call may be transmitted to Deployment 1 in Region 1. In this example, the control plane VCN 716, or Deployment 1 in Region 1, may not be communicatively coupled to, or otherwise in communication with, Deployment 1 in Region 2.

Figure 8:
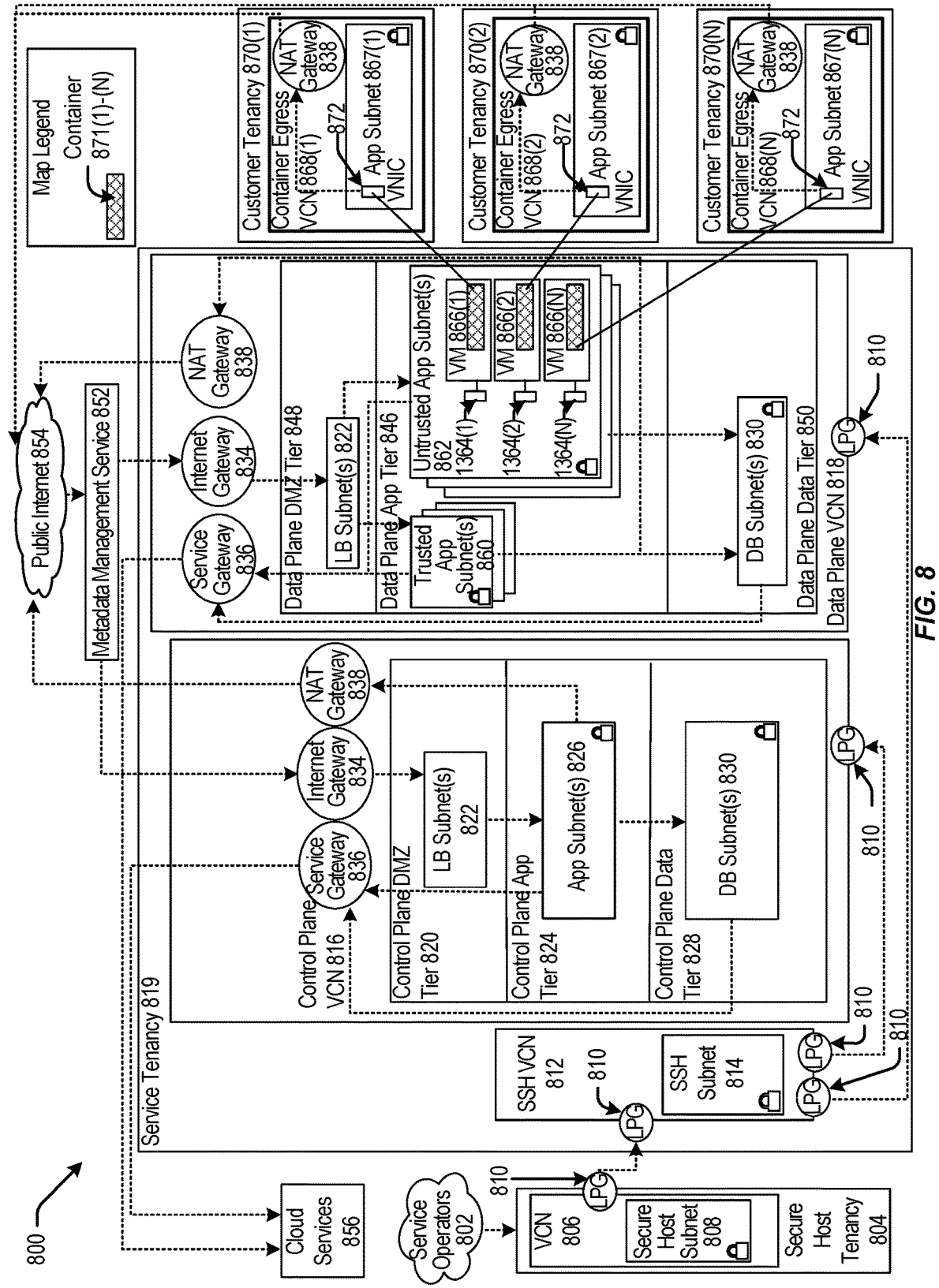
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 1) via an LPG 810 contained in the control plane VCN 816 and to a data plane VCN 818 (e.g. the data plane 618 of FIG. 1) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
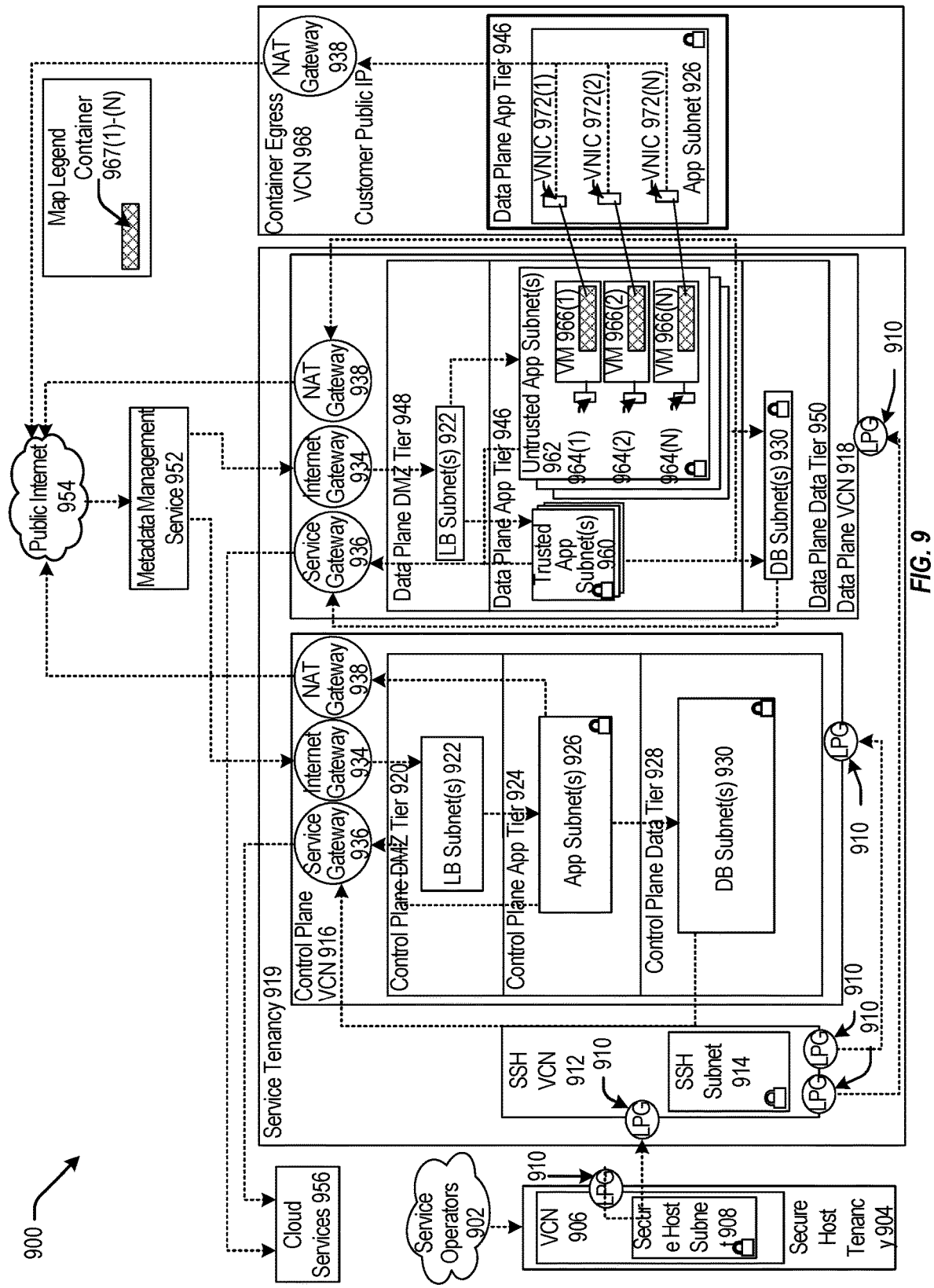
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
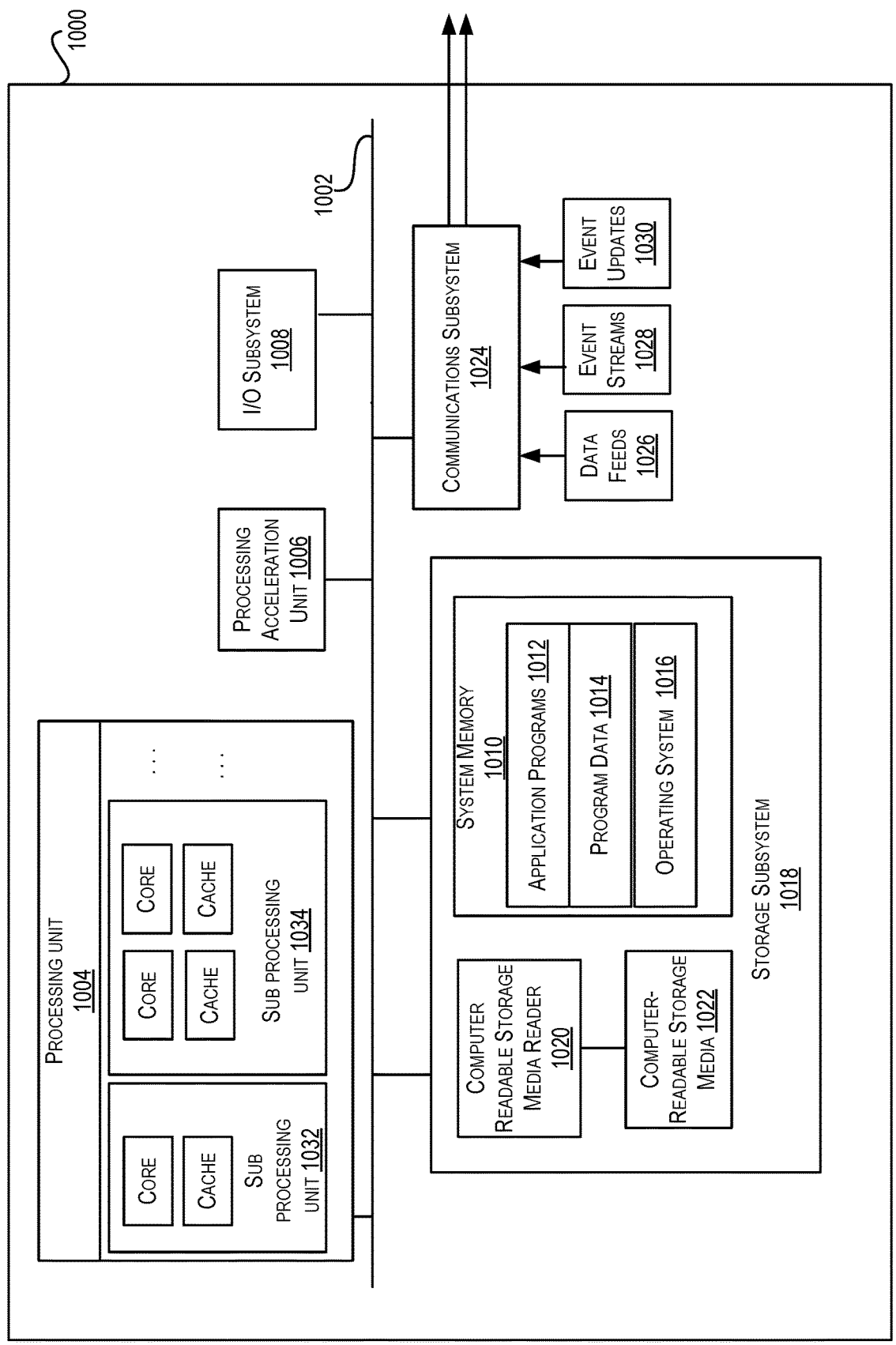
FIG. 10 is a block diagram illustrating an example computer system, according to at least one embodiment.

FIG. 10 illustrates an example computer system 1000, in which various embodiments of the present disclosure may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 100, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for mutually authenticated communications comprising:
    creating by a user device a first communication channel with a backend;
    creating by the user device a secure session across a second communication channel with the backend;
    receiving by the user device a first identification message from the backend via the second communication channel;
    receiving by the user device a second identification message from the backend via the first communication channel;

sending by the user device an attestation that the second identification message matches the first identification message to the backend via the second communication channel;
subsequent to sending the attestation that the second identification message matches the first identification message, receiving by the user device a second step authorization instruction from the backend via the second communication channel;
assessing by the user device the identity of a user; and
delivering an authorization response to the backend via the second communication channel based on the assessed identity of the user.

2. The method of claim 1, wherein the first communication channel comprises a voice connection via telephonic network, and wherein the second communication channel comprises an internet connection.

3. The method of claim 1, wherein creating the secure session across the second communication channel with the backend comprises logging in to a pre-established user account.

4. The method of claim 3, wherein creating with the secure session across the second communication channel with the backend comprises: downloading by the user device an application configured for generating a secure session with the backend across the second communication channel; and registering the user for mutually authenticated communications.

5. The method of claim 4, wherein registering the user for mutually authenticated communications comprises: generating a key pair comprising a public key and a private key; storing the private key on the user device; transmitting the public key to the backend; gathering security information from the user; and binding the private key and the security information.

6. The method of claim 5, wherein the authorization response is encrypted by the user device with the private key.

7. The method of claim 6, wherein gathering security information from the user comprises gathering security information via at least one sensor of the user device, and wherein the security information comprises biometric information of the user.

8. The method of claim 7, wherein the at least one sensor of the user device comprises at least one of: a fingerprint scanner; a camera; an ocular scanner; and a microphone.

9. The method of claim 7, wherein binding the security information and the security information comprises: generating an object representative of the security information; and linking the object representative of the security information with the private key.

10. The method of claim 9, further comprising: determining that the first identification message matches the second identification message; and encrypting the attestation with the private key, and wherein sending by the user device the attestation that the second identification message matches the first identification message to the backend via the second communication channel comprises sending the encrypted attestation.

11. The method of claim 10, wherein each of the first identification message and the second identification message comprise a One Time Pin.

12. The method of claim 9, further comprising executing an identification algorithm on the user device to gather identification information of the user, wherein the identity of the user is assessed based on the gathered identification information.

13. The method of claim 12, wherein the user device delivers the authorization response to the backend via the second communication channel when the assessed identity of the user matches the user associated with the pre-established user account.

14. The method of claim 12, wherein assessing by the user device the identity of the user comprises triggering a security module of the user device to gather the identification information and determine the identity of the user based on the gathered identification information.

15. The method of claim 14, wherein determining the identity of the user based on the gathered identification information comprises determining that the gathered security information corresponds to information associated with the pre-established user account.

16. A non-transitory computer-readable storage medium storing a plurality of instructions executable by one or more processors, the plurality of instructions when executed by the one or more processors cause the one or more processors to:
create by a user device a first communication channel with a backend;
create by the user device a secure session across a second communication channel with the backend;
receive by the user device a first identification message from the backend via the second communication channel;
receive by the user device a second identification message from the backend via the first communication channel;
send by the user device an attestation that the second identification message matches the first identification message to the backend via the second communication channel;
subsequent to sending the attestation that the second identification message matches the first identification message, receive by the user device a second step authorization instruction from the backend via the second communication channel;
assess by the user device the identity of a user; and
deliver an authorization response to the backend via the second communication channel based on the assessed identity of the user.

17. The non-transitory computer-readable storage medium of claim 16, wherein the first communication channel comprises a voice connection via telephonic network, and wherein the second communication channel comprises an internet connection.

18. A system for mutually authenticated communications, the system comprising:
a user device comprising:
a memory comprising a private key; and
a processor, wherein the processor is configured to:
create a first communication channel with a backend;
create a secure session across a second communication channel with the backend;
receive a first identification message from the backend via the second communication channel;
receive a second identification message from the backend via the first communication channel;
send an attestation that the second identification message matches the first identification message to the backend via the second communication channel;
subsequent to sending the attestation that the second identification message matches the first identification message, receive a second step authorization instruction from the backend via the second communication channel;
assess the identity of a user; and
deliver an authorization response to the backend via the second communication channel based on the assessed identity of the user.

19. The system of claim 18, wherein the first communication channel comprises a voice connection via telephonic network, and wherein the second communication channel comprises an internet connection.

20. The system of claim 18, wherein the user device delivers the authorization response to the backend via the second communication channel when the assessed identity of the user matches a user associated with a pre-established user account.

* * * * *